US012769876B2

(12) United States Patent
(10) Patent No.: US 12,769,876 B2
(45) Date of Patent: Oct. 20, 2026

Sheng et al.

(54) USER INFORMATION STORAGE CONTROL METHOD, ELECTRONIC DEVICE, AND NON-VOLATILE COMPUTER-READABLE STORAGE MEDIUM

(71) Applicant: Tianmian Information Technology (Shenzhen) Co., Ltd., Shenzhen (CN)

(72) Inventors: Huan Sheng, Shenzhen (CN); Huanming Wu, Shenzhen (CN); Cheng Shao, Shenzhen (CN)

(73) Assignee: Tianmian Information Technology (Shenzhen) Co., Ltd., Shenzhen (CN)

( * ) Notice: Subject to any disclaimer, the term of this patent is extended or adjusted under 35 U.S.C. 154(b) by 60 days.

(21) Appl. No.: 18/978,167

(22) Filed: Dec. 12, 2024

(65) Prior Publication Data

US 2025/0111085 A1 Apr. 3, 2025

(30) Foreign Application Priority Data

Nov. 18, 2024 (CN) ......................... 202411657581.6

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01); *G06F 21/6227* (2013.01)

(58) Field of Classification Search
CPC . G06F 21/6245; G06F 21/604; G06F 21/6227
See application file for complete search history.

(56) References Cited

U.S. PATENT DOCUMENTS

2016/0171119 A1* 6/2016 Bufe ................... G06F 16/9535 715/746
2021/0021603 A1* 1/2021 Gibbons ............... G06F 16/221
2022/0270612 A1* 8/2022 Ahmed ................. G06F 40/216
2023/0004793 A1* 1/2023 Choi ..................... G06F 18/254
2025/0356269 A1* 11/2025 Kok ........................ G06F 40/35

FOREIGN PATENT DOCUMENTS

WO WO-2016060547 A1 * 4/2016 ........... G06F 16/252
WO WO-2021060547 A1 * 4/2021 ............ H10W 90/00

* cited by examiner

*Primary Examiner* — Linglan Edwards
*Assistant Examiner* — Jacob Benedict Knackstedt

(57) ABSTRACT

The present disclosure relates to a user information storage control method, including: standardizing user data, and extracting user information in a preset format; generating a mapping subtable according to desensitized data and a mapping identifier of a sensitive field; dividing non-sensitive fields in the user information into regularized field information and irregularized field information, and mapping and storing the divided regularized field information and irregularized field information to generate a storage mapping table corresponding to the non-sensitive fields; and associating a user unique identity code in the user information with the corresponding mapping subtable and storage mapping table to generate a mapping main table, and storing the mapping subtable, the mapping main table and the storage mapping table in a same storage area or in a plurality of different storage areas respectively. The present disclosure may improve the data storage security and reduce the storage capacity.

17 Claims, 3 Drawing Sheets

USER INFORMATION STORAGE CONTROL METHOD, ELECTRONIC DEVICE, AND NON-VOLATILE COMPUTER-READABLE STORAGE MEDIUM

CROSS REFERENCE TO RELATED APPLICATIONS

The present application claims the benefit of Chinese Patent Application No. 2024116575816 filed on Nov. 18, 2024, the contents of which are incorporated herein by reference in their entirety.

TECHNICAL FIELD

The present disclosure relates to the technical field of data processing, and more particularly relates to a user information storage control method, an electronic device, and a non-volatile computer-readable storage medium.

BACKGROUND

At present, a user generally installs a plurality of application programs in a user side, and when the application programs are used, the user is generally required to upload user information for distinguishing and validating a user identity. Since storage approaches for various user information are often different, the user is required to manually search for own user information through a plurality of approaches for input, which is relatively low in efficiency and prone to errors. In addition, most of the user information required by different application programs is the same, such as name, address, cell phone number, and identity card.

For the existing user information storage control technology, the same information is required to be repeatedly input in a plurality of applications when uploading the user information, so that a large amount of repeated operation occurs, and information acquisition approaches are complicated and cumbersome each time the user needs to acquire the user information. Moreover, original data is stored in a server, thereby resulting in easy leakage of data and more capacity space for the storage of the original data, and enabling the data storage security to be relatively low and the storage capacity to be relatively high.

SUMMARY

The present disclosure provides a user information storage control method, an electronic device, and a non-volatile computer-readable storage medium, and a main object of the present disclosure is to solve the problems of relatively low data storage security and relatively high storage capacity.

In order to achieve the above object, the present disclosure provides a user information storage control method, including:

receiving user data of each user sent by a user side, standardizing each of the user data to obtain a corresponding standard format file, and extracting user information in a preset format from the standard format files by utilizing a multi-modal information collection model;

performing data desensitization on a sensitive field in the user information to obtain desensitized data, and generating a mapping subtable according to the desensitized data and a mapping identifier of the sensitive field;

dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas.

Optionally, after receiving an original user information decryption request carrying the user unique identity code sent by the user side, directly or after permission validation is passed, the mapping subtable and the storage mapping table corresponding to the user unique identity code are determined according to the mapping main table, and original user information of the sensitive field and the non-sensitive field corresponding to the user unique identity code is fed back to the user side.

Optionally, the extracting user information in a preset format from each of the standard format files by utilizing a multi-modal information collection model, including:

receiving the input standard format file and a user information extraction instruction by utilizing the multi-modal information collection model, the user information extraction instruction including extraction content and a corresponding preset format;

when a file type corresponding to the standard format file is a unique file type, extracting a depth feature of the standard format file by utilizing the multi-modal information collection model to obtain a structured file feature;

when the standard format file is a file set containing files of a plurality of file types, respectively extracting the depth feature of each file in the file set by utilizing the multi-modal information collection model, and fusing the features extracted from each file to obtain structured file features; and acquiring the extraction content in the preset format from the file features according to the user information extraction instruction as user information in the preset format.

Optionally, before the performing data desensitization on a sensitive field in the user information, the method further includes:

returning the user information in the preset format to the user side;

generating and displaying a user information display and operation interface with a confirmation operation control and a modification operation control by the user side for a user to send a confirmation instruction for the displayed user information in the preset format based on the confirmation operation control, or for the user to modify the displayed user information in the preset format based on the modification operation control and provide feedback; and when the confirmation instruction fed back by the user side is received, taking the user information in the preset format as data to be subjected to data desensitization, or when modified user information fed back by the user side is received, taking the modified user information as data to be subjected to data desensitization.

Optionally, the generating a mapping subtable according to the desensitized data and a mapping identifier of the sensitive field, includes:

identifying a desensitization type corresponding to the desensitized data, and determining a desensitization attribute corresponding to the desensitized data according to the desensitization type;

creating a mapping structure corresponding to the desensitization type according to the desensitization attribute and the mapping identifier of the sensitive field;

generating a mapping format corresponding to the desensitization type in accordance with the mapping structure, and generating a mapping subtable corresponding to the desensitization type according to the mapping format and the mapping identifier; and storing attribute data of the desensitization attribute corresponding to the desensitization type in the mapping subtable.

Optionally, before the mapping and storing the divided regularized field information and irregularized field information according to a predetermined information code mapping table, the method further includes:

calculating a multiplicity of regularized field information and irregularized field information in pre-acquired historical stored user information;

filtering regularized field information to be encoded and irregularized field information to be encoded in the regularized field information and the irregularized field information according to the multiplicity; and performing field encoding on the regularized field information to be encoded and the irregularized field information to be encoded, and pooling the encoded regularized field information to be encoded and irregularized field information to be encoded into an information code mapping table.

Optionally, the mapping and storing the divided regularized field information and irregularized field information according to a predetermined information code mapping table so as to generate a storage mapping table corresponding to the non-sensitive fields, includes:

querying a regularized information code corresponding to the regularized field information and an irregularized information code corresponding to the irregularized field information in the information code mapping table;

mapping and storing the regularized information code and the regularized field information to obtain a regularized storage mapping table corresponding to the regularized field information;

mapping and storing the irregularized information code and the irregularized field information to obtain an irregularized storage mapping table; and pooling the regularized storage mapping table and the irregularized storage mapping table into a storage mapping table corresponding to the non-sensitive fields.

In order to solve the above problems, the present disclosure further provides a user information storage control apparatus, including:

a data collection module configured for receiving user data of each user sent by a user side, standardizing each of the user data to obtain a corresponding standard format file, and extracting user information in a preset format from each of the standard format files by utilizing a multi-modal information collection model;

a sensitive data mapping module configured for performing data desensitization on a sensitive field in the user information to obtain desensitized data, and generating a mapping subtable according to the desensitized data and a mapping identifier of the sensitive field;

a field information mapping module configured for dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and a data storage module configured for associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas.

In order to solve the above problems, the present disclosure further provides an electronic device, including:

at least one processor; and a memory in communication connection with the at least one processor; wherein the memory stores a computer program executable by the at least one processor, and the computer program is executed by the at least one processor to cause the at least one processor to execute the above user information storage control method.

In order to solve the above problems, the present disclosure further provides a computer-readable storage medium having at least one computer program stored therein, wherein the at least one computer program is executed by a processor in an electronic device to implement the above user information storage control method.

In the example of the present disclosure, the user information is acquired in a unified manner through an information collection application program based on the multimodal information collection model, so that the user data of various types and styles uploaded by the user can be converted into the user information in a standard format, thereby facilitating subsequent information calling and unified maintenance, and facilitating information storage of the user; data desensitization is performed on the sensitive field to generate the mapping subtable, so that desensitization processing may ensure that sensitive data cannot be leaked during storage and transmission processes, and the risk of data leakage is reduced; the mapping main table is generated, the desensitized data and the mapping identifier are stored, and the desensitized data and mapping information are stored separately and associated through the main table, thereby ensuring that the integrity and availability of the data are still maintained after desensitization; the information is divided into regularized and irregularized parts, thereby being conducive to the optimization and processing of the data of different types respectively, and reducing unnecessary duplicate information storage; and the mapping table is separately stored in a cloud database and expired information is periodically detected, thereby improving the accuracy of the user information. Therefore, the user information storage control method, the electronic device, and the non-volatile computer-readable storage medium provided in the present disclosure may improve the data storage security and reduce the storage capacity.

BRIEF DESCRIPTION OF THE ACCOMPANYING DRAWINGS

The achieved objects, functional features and advantages of the present disclosure will be further described with reference to the accompanying drawings in conjunction with the examples.

DETAILED DESCRIPTION OF ILLUSTRATED EMBODIMENTS

It should be understood that the specific examples described herein are illustrative of the present disclosure only and are not intended to limit the present disclosure.

An example of the present application provides a user information storage control method. An execution main body of the user information storage control method includes, but is not limited to, at least one of electronic devices such as a server side and a terminal which can be configured for executing the method provided in the example of the present application. In other words, the user information storage control method may be executed by software or hardware installed in a terminal device or a server side device, and the software may be a block chain platform. The server side includes, but is not limited to, a single server, a server cluster, a cloud server or a cloud server cluster, and the like. The server may be a stand-alone server, and may also be a cloud server providing basic cloud computing services, such as a cloud service, a cloud database, cloud computing, a cloud function, cloud storage, a network service, cloud communication, a middleware service, a domain name service, a security service, a Content Delivery Network (CDN), and a big data and artificial intelligence platform.

Figure 1:
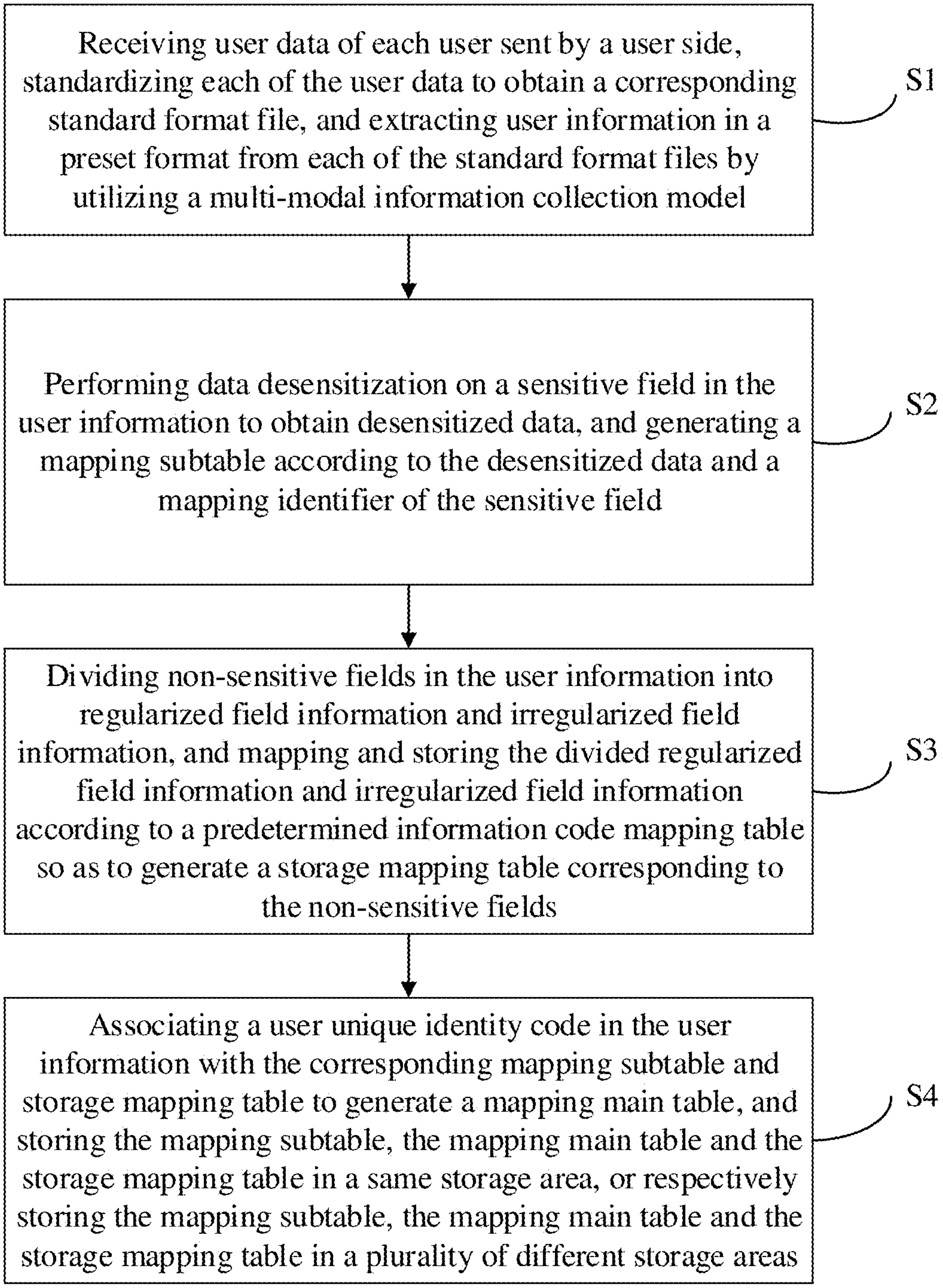
FIG. 1 is a schematic flow diagram of a user information storage control method provided in an example of the present disclosure.

Referring to FIG. 1, FIG. 1 is a schematic flow diagram of a user information storage control method provided in an example of the present disclosure. In this example, the user information storage control method includes:

S1. receiving user data of each user sent by a user side, standardizing each of the user data to obtain a corresponding standard format file, and extracting user information in a preset format from each of the standard format files by utilizing a multi-modal information collection model.

In the example of the present disclosure, the user side is in communication connection with a server side through an installed information collection app (namely, an information collection application program), and receives the user data uploaded by a user through a data uploading interface provided by the information collection app; and the server side includes a preprocessing module, the multi-modal information collection model, and a cloud database.

In the example of the present disclosure, the user data may be a text file, an image file or a voice file in any format, and the user data is preprocessed by the preprocessing module to obtain the standard format file, wherein the standard format file refers to an input data format corresponding to the multi-modal information collection model.

In the example of the present disclosure, the standardizing the user data to obtain the standard format file, includes: identifying a format of the user data, and converting the user data into a file in a standard format, wherein the standard format file refers to the input data format corresponding to the multi-modal information collection model.

In detail, the multi-modal information collection model (for example, a model such as NEXT-GPT and MM-LLM) may identify and extract a file of information, such as a text file in a word or txt format, an image file in a jpg or png format, and an audio file in an mp3 or WAV format. For example, the user opens the data uploading interface on an information collection app of the user side to upload the user data to the server side, and the server side identifies a file type of the user data through the preprocessing module (for example, currently there are many preprocessing modules which may identify the file type, such as Libmagic, Mime-Detective, and file-type on the market), and performs format conversion on the user data according to the file format in which the multi-modal information collection model may identify and extract information; when the file type is the text file, the user data is converted into a txt text file; when the file type is the image file, the user data is converted into a png image file; and when the file type is the audio file, the user data is converted into a wav audio file.

In the example of the present disclosure, the extracting user information in a preset format from each of the standard format files by utilizing a multi-modal information collection model, includes: receiving the input standard format file and a user information extraction instruction by utilizing the multi-modal information collection model, the user information extraction instruction including extraction content and a corresponding preset format;

- when a file type corresponding to the standard format file is a unique file type, extracting a depth feature of the standard format file by utilizing the multi-modal information collection model to obtain a structured file feature;
- when the standard format file is a file set containing files of a plurality of file types, respectively extracting the depth feature of each file in the file set by utilizing the multi-modal information collection model, and fusing the features extracted from each file to obtain structured file features; and
- acquiring the extraction content in the preset format from the file features according to the user information extraction instruction as user information in the preset format.

In detail, the user information extraction instruction is a text described in a natural language, the user data in the preset format is a character string in a JSON format, the user uses the information collection APP at the user side for uploading the user data in an arbitrary format to the server side, and the server side preprocesses and inputs the user data into the multi-modal information collection model to extract the user information in the preset format.

Illustratively, the user data input by the user is the following document: "I am Zhang X, an 18-year-old boy, and I would like to be able to show my unique personality traits and abilities here. My cell phone number is 187XXXXXXXX, and QQ number is 371XXXXX. Firstly, I want to talk about my personality. In my opinion, I am lively and outgoing, and always full of positive attitudes towards life. This allows me to easily integrate into various social occasions and establish good interpersonal relationships with people. This personality characteristic is also reflected in my interests and hobbies. I love sports, especially badminton, table tennis and basketball. These exercises make me happy, not only building up my body, but also fostering my teamwork and leadership. As a class sports commissioner, I successfully organized a number of sports events, which trained my organization and coordination abilities. In addition to sports, I am also interested in volunteer work. I participated in a volunteer program to help pupils improve their reading skills. This experience not only made me more concerned about social issues, but also taught me patience and responsibility. I believe that through volunteer work we can improve the community and society and benefit more people. In the future, I would like to be able to continuously develop my skills and personality traits. I plan to go further into the sports field, perhaps become a sports coach, and pass on my hospitality to more people. At the same time, I would like to continuously upgrade myself and make more contributions to society through learning and volunteer work. Thank you for listening.", and a front image and a back image of an identity card are uploaded.

Specifically, the server side converts the above document into a txt file, converts the images of the identity card into png files, and inputs the txt file and the png files into the multi-modal information collection model. According to the user information extraction instruction "please extract the user's name, age, cell phone number, QQ, identity card number, validity period of the identity card, gender, personality traits, interests and hobbies, position, volunteer experience, lessons learned from volunteer work, and future planning in a preset format of JSON", the extracted text data in the preset format is as follows: "{ "name": "Zhang X", "age": 18, "cell phone number": "187XXXXXXXX". "QQ": "371XXXXX", "identity card number": "330122XXXXXXXXXXXX", "validity period of the identity card": "2008.10.28-2028.10.28", "gender": "male", "personality traits": "lively and outgoing, positive attitudes towards life", "interests and hobbies": "badminton, table tennis and basketball", "position": "class sports commissioner", "volunteer experience": "help pupils improve their reading skills", "lessons learned from volunteer work": "patience and responsibility", and "future planning": "go further into the sports field, become a sports coach, learning and volunteer work, make more contributions to society"}".

Further, in order to prevent data from being stolen during the storage process and prevent sensitive information from being illegally accessed, disclosed or abused, desensitization processing is required to be performed on the data, and the desensitized data is subjected to fuzzy storage, so as to ensure the security of the data during the storage process.

S2. performing data desensitization on a sensitive field in the user information to obtain desensitized data, and generating a mapping subtable according to the desensitized data and a mapping identifier of the sensitive field.

It should be noted that a type of the sensitive field may be predetermined, and generally refers to privacy information which may point to a determined user, such as name, cell phone number, identity card number, bank card number, and specific domicile house number in address (for example, the specific domicile house number "ABC" in this address "ABC, XX Tower, XX Road, XX Street, XX District, XX City, XX Province, XX Country" points to the determined user, and therefore "ABC" may be determined as the sensitive field).

In the example of the present disclosure, in order to ensure the accuracy of the user information, before performing data desensitization, the user information in the preset format may be fed back to the user side for confirmation, and data desensitization may be performed after confirmation.

In the example of the present disclosure, before the performing data desensitization on a sensitive field in the user information, the method further includes:

returning the user information in the preset format to the user side;

generating and displaying a user information display and operation interface with a confirmation operation control and a modification operation control by the user side for a user to send a confirmation instruction for the displayed user information in the preset format based on the confirmation operation control, or for the user to modify the displayed user information in the preset format based on the modification operation control and provide feedback; and when the confirmation instruction fed back by the user side is received, taking the user information in the preset format as data to be subjected to data desensitization, or when modified user information fed back by the user side is received, taking the modified user information as data to be subjected to data desensitization.

In detail, the user side displays and confirms the user data in the preset format fed back by the server side on the information confirmation interface of the information collection app, and the information confirmation interface is an interface of the information collection app installed at the user side for displaying the user data in the preset format for the user to confirm or modify.

In the example of the present disclosure, the data desensitization refers to processing sensitive information in the user information, so as to prevent sensitive data from being leaked or abused, protect privacy and confidentiality, and ensure that the sensitive information cannot be exposed.

In the example of the present disclosure, the performing data desensitization on a sensitive field in the user information to obtain desensitized data, includes: identifying a mask position of sensitive data corresponding to the sensitive field; and replacing the sensitive data corresponding to the mask position with a preset desensitization symbol to obtain desensitized data.

In detail, the sensitive field includes, but is not limited to, name, identity card number, cell phone number, and bank card number. For the data in each sensitive field, it is necessary to specify which parts need to be desensitized, for example, for one cell phone number, it may be necessary to hide several bits in the middle (for example, 139**5678); for the identity card number, several figures in the middle (for example, 330**1234) may be hidden, then some parts of the sensitive data may be replaced with preset desensitization symbols, and corresponding parts in the sensitive data may be replaced with the preset desensitization symbols according to the identified mask positions, for example, for one bank card number 1234 5678 9012 3456, the bank card number may be converted into 1234 3456, wherein the mask part "**" represents the desensitized part, so that the sensitive data corresponding to the sensitive fields is desensitized to obtain desensitized data corresponding to the sensitive data, so as to ensure the security of the data during the storage process.

Further, in order to be able to restore original data (if legally authorized or required) when needed and ensure the traceability and compliance of data processing, it is necessary to record a relationship between the original sensitive data and the desensitized data during the process of processing the desensitized data.

In the example of the present disclosure, the mapping subtable refers to storing a mapping relationship between the original data and the desensitized data, so as to ensure the traceability and compliance of data processing.

In the example of the present disclosure, the generating a mapping subtable according to the desensitized data and a mapping identifier of the sensitive field, includes:

identifying a desensitization type corresponding to the desensitized data, and determining a desensitization attribute corresponding to the desensitized data according to the desensitization type;

creating a mapping structure corresponding to the desensitization type according to the desensitization attribute and the mapping identifier of the sensitive field;

generating a mapping format corresponding to the desensitization type in accordance with the mapping structure, and generating a mapping subtable corresponding to the desensitization type according to the mapping format and the mapping identifier; and storing attribute data of the desensitization attribute corresponding to the desensitization type in the mapping subtable.

In detail, a desensitization field type corresponding to the desensitized data is identified, the desensitization type includes, but is not limited to, name, identity card number, cell phone number, and bank card number, and the desensitization attribute corresponding to the desensitized data is determined one by one according to each desensitization type, and the desensitization attribute refers to the desensitization field type, original data, desensitized data, and a desensitization rule, wherein the original data refers to sensitive data in the original user information; the desensitized data refers to data after desensitizing the sensitive data in the user information; and the desensitization rule includes, but is not limited to, partially hiding and partially hiding in the middle, so that the mapping structure corresponding to each desensitization type is created based on the desensitization attribute and the mapping identifier corresponding to the sensitive field, the mapping structure is used for specifying the original data, the desensitized data, and the relevant desensitization rule, and then a mapping format is generated according to the mapping structure, including field naming, a data type, a storage mode, and the like, so as to generate the mapping subtable corresponding to each desensitization field type.

Illustratively, if the desensitization field type is name, a name mapping table is constructed, and the mapping format is mapped with the mapping identifier, for example, the name mapping ID is 1, the original data is Zhang San, the desensitized data is Zhang*, and the desensitization rule is partially hiding; the name mapping ID is 2, the original data is Li San, the desensitized data is Li*, and the desensitization rule is partially hiding, so as to obtain the mapping subtable corresponding to the name field; and likewise, mapping subtables corresponding to all the sensitive fields are constructed based on the field mapping ID and the desensitization attribute, so as to obtain the mapping subtable corresponding to each sensitive field.

Further, there is a relatively high risk of leakage when sensitive data (such as name, identity card number, and cell phone number) of the user is directly stored in a user information table, and therefore, a mapping main table is required to be generated to separate the sensitive data from the user information; and even if an attacker acquires the user information table, the attacker cannot directly acquire the sensitive information of the user, so that the risk of leakage is reduced by storing the sensitive information in the mapping subtable.

S3. dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields.

It should be noted that the non-sensitive fields refer to fields other than the sensitive field, and generally refer to general information which cannot point to a determined user, for example, interests and hobbies, personality, living habits, and field information except for the specific domicile house number in the address (for example, the field information "XX Tower, XX Road, XX Street, XX District, XX City, XX Province, XX Country" in this address "ABC, XX Tower, XX Road, XX Street, XX District, XX City, XX Province, XX Country" except for the specific domicile house number "ABC" cannot point to the determined user, and therefore "XX Tower, XX Road, XX Street, XX District, XX City, XX Province, XX Country" may be determined as the non-sensitive fields), and the like.

In the example of the present disclosure, the non-sensitive fields may be address, interests and hobbies, personality, living habits, and the like, the regularized field information refers to data which has been explicitly formatted and standardized, and standardization refers to structured information which can be described in a unified manner by dividing the data into a plurality of tables and ensuring that redundancy and data inconsistency are avoided through foreign key association between the tables; the irregularized field information refers to text data without a fixed format or structure; and a plurality of field information is combined and stored in one table, and there may be redundant or repeated data, so that the non-sensitive fields in the user information are divided into regularized field information and irregularized field information.

Further, in order to reduce the consumption of the storage space, it is necessary to optimize the user information with a high multiplicity, and therefore, it is necessary to calculate the multiplicity corresponding to the divided regularized field information and irregularized field information, and then to optimally store the user information according to the multiplicity.

In the example of the present disclosure, the information code mapping table is determined according to analysis of historical stored user information.

In the example of the present disclosure, before the mapping and storing the divided regularized field information and irregularized field information according to a predetermined information code mapping table, the method further includes:

calculating a multiplicity of regularized field information and irregularized field information in pre-acquired historical stored user information;

filtering regularized field information to be encoded and irregularized field information to be encoded in the regularized field information and the irregularized field information according to the multiplicity; and performing field encoding on the regularized field information to be encoded and the irregularized field information to be encoded, and pooling the encoded regularized field information to be encoded and irregularized field information to be encoded into an information code mapping table.

In detail, the multiplicity refers to the number of occurrences of the information attribute in the user information, and measures the frequency or proportion of the user information being repeated. For example, in a data set, if the same information repeatedly appears in a plurality of records, it is indicated that the multiplicity of the information is relatively high, the multiplicities of the regularized field information and the irregularized field information are respectively calculated, namely, with regard to the regularized field information, the multiplicity is determined by the ratio of the total number of occurrences of each data entry in the data set to the total size of the data set, for example, there is an address field in the regularized field information, and then the multiplicity is calculated by counting the number of occurrences of each address in the data set. If the data set has a total of 5 records, and the xx address appears for 3 times, the multiplicity of the xx address is 0.6, while the multiplicity of the regularized field information is generally relatively high, since regularized data items often have certain standardization and sharing characteristics, and repeatedly appear in a plurality of records; and with regard to the irregularized field information, it is necessary to calculate the frequency of occurrence of each data, if there is the field of interests and hobbies in the user table, while playing basketball appears for 3 times, watching movies appears for 4 times, and there are a total of 5 users, the multiplicity of playing basketball is 0.6, and the playing of watching movies is 0.8.

Specifically, fields suitable for encoding are filtered according to the multiplicity and regularity. Regularized fields (such as name, gender, date of birth, and the like) are often selected preferentially, and with regard to irregularized fields, some text fields with a relatively high frequency of occurrence may be selected for encoding, then an encoding mode of each field is determined, and then the regularized fields may be mapped by using methods such as number encoding and range encoding; and the irregularized fields be mapped by using keywords, hash values, and the like, and specific codes are assigned according to field characteristics, for example, codes “001” and “002” are assigned to the gender field, “travel and photography” in the hobby field may be mapped to “005”, and some common words of self-introduction may be mapped to “006”, so as to obtain the information code mapping table.

Further, the regularized field information and the irregularized field information may be mapped and stored in a unified manner according to the predetermined information code mapping table.

In the example of the present disclosure, the storage mapping table refers to a structure used for efficiently searching for and storing data, which reduces the data duplication, improves the storage efficiency and accelerates a query process by associating data with an index or code. The mapping table includes a mapping key and a mapping value, wherein the mapping key is used for uniquely identifying a code or identifier of each data item, and the mapping value is real data corresponding to the mapping key.

In the example of the present disclosure, the mapping and storing the divided regularized field information and irregularized field information according to a predetermined information code mapping table so as to generate a storage mapping table corresponding to the non-sensitive fields, includes:

querying a regularized information code corresponding to the regularized field information and an irregularized information code corresponding to the irregularized field information in the information code mapping table;

mapping and storing the regularized information code and the regularized field information to obtain a regularized storage mapping table corresponding to the regularized field information;

mapping and storing the irregularized information code and the irregularized field information to obtain an irregularized storage mapping table; and pooling the regularized storage mapping table and the irregularized storage mapping table into a storage mapping table corresponding to the non-sensitive fields.

In detail, a regularized field refers to a field which has a relatively fixed format and may be mapped according to some standards. For example, gender, age, date of birth, and the like, if the regularized field mapping table includes field names gender, date of birth, age, and the like, the corresponding mapping rule is male/female, date, calculation of date of birth, the corresponding storage code is 001=male, 002=female, date of birth being birth date, and the like, while with regard to the mapping of the irregularized fields, for example, the field name is hobby, the corresponding storage code is 001=travel, 002=photography, 003=sports, the field name is address, the corresponding storage code is 010001=Beijing, 010002=Shanghai, the field name is profession, and the corresponding storage code is 001=programmer, 002=designer.

Specifically, the regularized fields (for example, gender, date of birth, and the like) and the codes corresponding thereto are stored in the regularized storage mapping table, and the table records an actual value of each regularized field and corresponding code information; and with regard to the irregularized fields (for example, hobby, self-introduction, and the like), the information and codes thereof are also mapped and stored to generate the irregularized storage mapping table, and the table records an actual value of each irregularized field and corresponding code information.

Illustratively, the “hobby code” of the user 1001 is “001, 002”, and it is indicated that the user’s hobby includes “travel” and “photography”; the “self-introduction code” thereof is “001”, and it is indicated that the user’s self-introduction is “optimism”; and the address code “010001” means “Beijing”, and the profession code “001” means “programmer”.

Further, in order to improve the security of data storage and reduce the storage space, it is necessary to store different mapping tables separately or in a unified manner, so as to reduce the complexity of the tables and optimize the storage performance.

S4. associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas.

In the example of the present disclosure, the mapping main table is a main table used for storing relationships between different data tables. It is generally used for associating data of a plurality of subtables, and integrating these data into a unified structure, so as to facilitate the management, query, maintenance or analysis of the data.

In detail, the user unique identity code is a code used for representing the identity of the user, which may be an identity card number of the user, and the mapping main table contains the unique identity code of the user and code information of a plurality of fields, the code information of each field is associated through the mapping subtable (the regularized storage mapping table and the irregularized storage mapping table), then the user ID in each subtable (regularized and irregularized) is associated with the corresponding field code, and then the codes of all these fields are pooled into one main table.

Specifically, code information of sensitive information of each user is extracted from the mapping subtable according to the unique identity code (user ID) of the user, code information (such as a gender code, a date of birth code, and an age code) of each user is extracted from the regularized storage mapping table according to the unique identity code (user ID) of the user, and code information (such as a hobby code, a self-introduction code, an address code, and a profession code) of each user is extracted from the irregularized storage mapping table according to the unique identity code (user ID) of the user, and then each user ID and the code information of all relevant fields are pooled in the same row to form the mapping main table.

Further, the mapping subtable, the mapping main table, and the storage mapping table are stored in the same storage area, or respectively stored in a plurality of different storage areas, namely, the mapping subtable, the mapping main table, and the storage mapping table are stored in the same storage area, indicating that all the data tables (the subtable, the main table, and the like) are stored in the same database or storage system, which may be the same physical magnetic disk, the same database instance or the same data warehouse; and the mapping subtable, the mapping main table, and the storage mapping table are respectively stored in different storage areas or database instances, which may be physically separate different magnetic disks, different servers, or in different database systems.

Further, an expiration time field is added in each mapping table to identify the expiration time of the user information, database query is periodically executed by utilizing a timed task, expired data is detected and cleaned or marked as expired, and once the data is detected to be expired, if the data is no longer needed, the expiration record may be directly deleted; if you do not want to delete the data completely, you can choose to add a "status" field, such as status field, to the record and set it as "expired", so as to keep the historical data but make it no longer participate in active queries. For the expired user information, the information will be updated, so that the data stored in the cloud database changes in real time, thereby achieving the synchronous storage of data.

In the example of the present disclosure, after receiving an original user information decryption request carrying the user unique identity code sent by the user side, directly or after permission validation is passed, the mapping subtable and the storage mapping table corresponding to the user unique identity code are determined according to the mapping main table, and original user information of the sensitive field and the non-sensitive field corresponding to the user unique identity code is fed back to the user side.

In detail, the original user information fed back may change in real time, when the user information expires, an information updating reminder is sent to the user side corresponding to the expired user information, updated user information fed back by the user side based on the information updating reminder is received to update the expired user information, and the updated user information is stored in the mapping table corresponding to the updated user information in the cloud database.

Specifically, an information updating instruction sent by the user side according to the information updating reminder is received, and the expired user information is fed back to the user side; the updated user information sent by the user side is received, and the expired user information is updated according to the updated user information; user data re-uploaded by the user side is received, and user information in the preset format is extracted from the re-uploaded user data by utilizing the multi-modal information collection model to update the expired user information.

Further, when receiving the information updating instruction actively sent by the user side, newly constructed user data uploaded by the user side is acquired; newly constructed user data in the preset format is extracted from the newly constructed user data by utilizing the preprocessing module and the multi-modal information collection model, the user information in the cloud database is updated according to the newly constructed user data, and after the information in the cloud database is updated, a newly constructed user portrait is generated according to the updated user information, and the newly constructed user portrait is stored in the cloud database.

In the example of the present disclosure, the user information is acquired in a unified manner through an information collection application program based on the multi-modal information collection model, so that the user data of various types and styles uploaded by the user can be converted into the user information in a standard format, thereby facilitating subsequent information calling and unified maintenance, and facilitating information storage of the user; data desensitization is performed on the sensitive field to generate the mapping subtable, so that desensitization processing may ensure that sensitive data cannot be leaked during storage and transmission processes, and the risk of data leakage is reduced; the mapping main table is generated, the desensitized data and the mapping identifier are stored, and the desensitized data and mapping information are stored separately and associated through the main table, thereby ensuring that the integrity and availability of the data are still maintained after desensitization; the information is divided into regularized and irregularized parts, thereby being conducive to the optimization and processing of the data of different types respectively, and reducing unnecessary duplicate information storage; and the mapping table is separately stored in a cloud database and expired information is periodically detected, thereby improving the accuracy of the user information. Therefore, the user information storage control method and apparatus, the device, and the medium provided in the present disclosure may solve the problems of relatively low data storage security and relatively high storage capacity.

Figure 2:
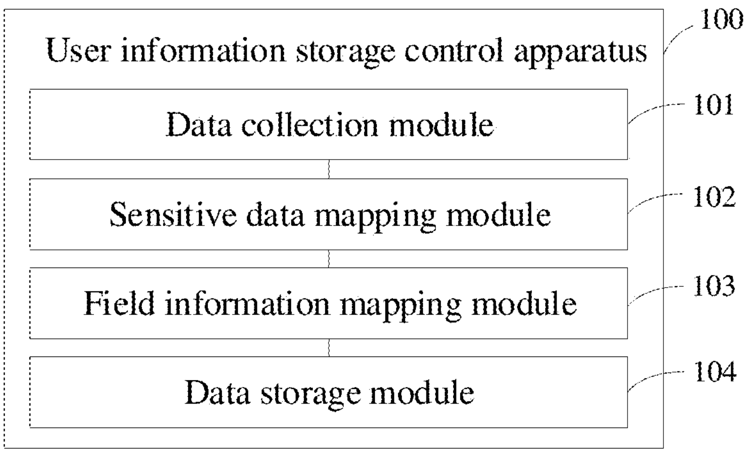
FIG. 2 is a functional block diagram of a user information storage control apparatus provided in an example of the present disclosure.

As shown in FIG. 2, FIG. 2 is a functional block diagram of a user information storage control apparatus provided in an example of the present disclosure.

The user information storage control apparatus 100 according to the present disclosure may be installed in an electronic device. According to the implemented functions, the user information storage control apparatus 100 may include a data collection module 101, a sensitive data mapping module 102, a field information mapping module 103, and a data storage module 104. The module according to the present disclosure, which may also be referred to as a unit, refers to a series of computer program segments capable of being executed by a processor of the electronic device and capable of implementing fixed functions, which are stored in a memory of the electronic device.

In this example, the functions of each module/unit are as follows:

the data collection module 101 is configured for receiving user data of each user sent by a user side, standardizing each of the user data to obtain a corresponding standard format file, and extracting user information in a preset format from each of the standard format files by utilizing a multi-modal information collection model;

the sensitive data mapping module 102 is configured for performing data desensitization on a sensitive field in the user information to obtain desensitized data, and generating a mapping subtable according to the desensitized data and a mapping identifier of the sensitive field;

the field information mapping module 103 is configured for dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and the data storage module 104 is configured for associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas.

In detail, in the example of the present disclosure, each module in the user information storage control apparatus 100 is used in the same technical means as the user information storage control method described above in FIG. 1 and can produce the same technical effect, which will not be described in detail herein.

Figure 3:
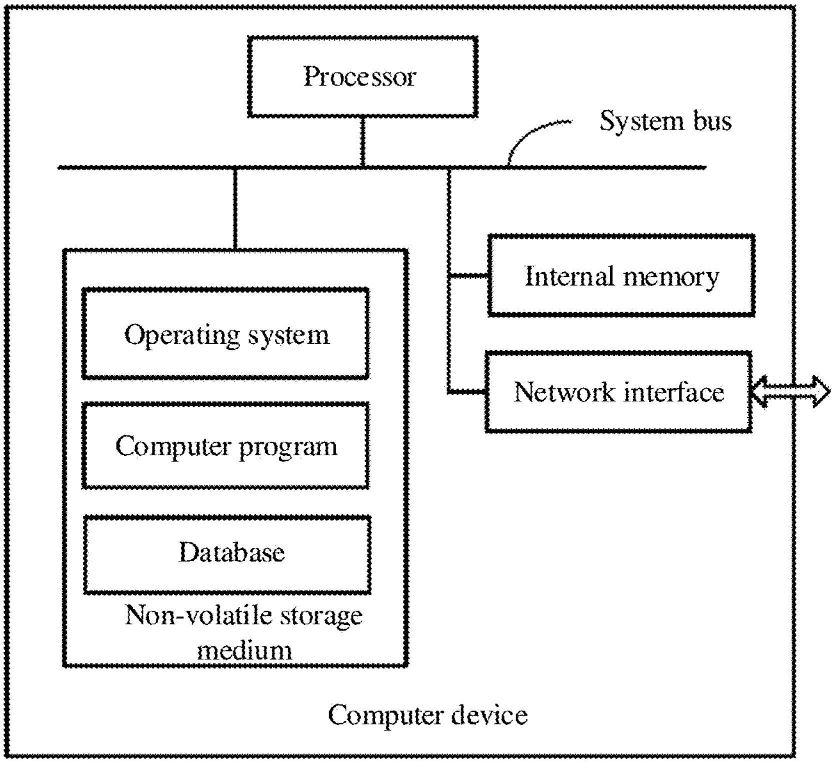
FIG. 3 is a schematic structural diagram of a computer device in an example of the present disclosure.

In one example, provided is a computer device, which may be a server side, with an internal structure thereof as shown in FIG. 3. The computer device includes a processor, a memory, a network interface, and a database which are connected through a system bus, wherein the processor of the computer device is configured for providing computing and control capabilities. The memory of the computer device includes a non-volatile and/or volatile storage medium, and an internal memory. The non-volatile storage medium stores an operating system, a computer program, and a database. The internal memory provides an environment for the running of the operating system and the computer program in the non-volatile storage medium. The network interface of the computer device is configured for communicating with an external client side through network connection. The computer program implements, when executed by the processor, functions or steps of a server side for the user information storage control method.

Figure 4:
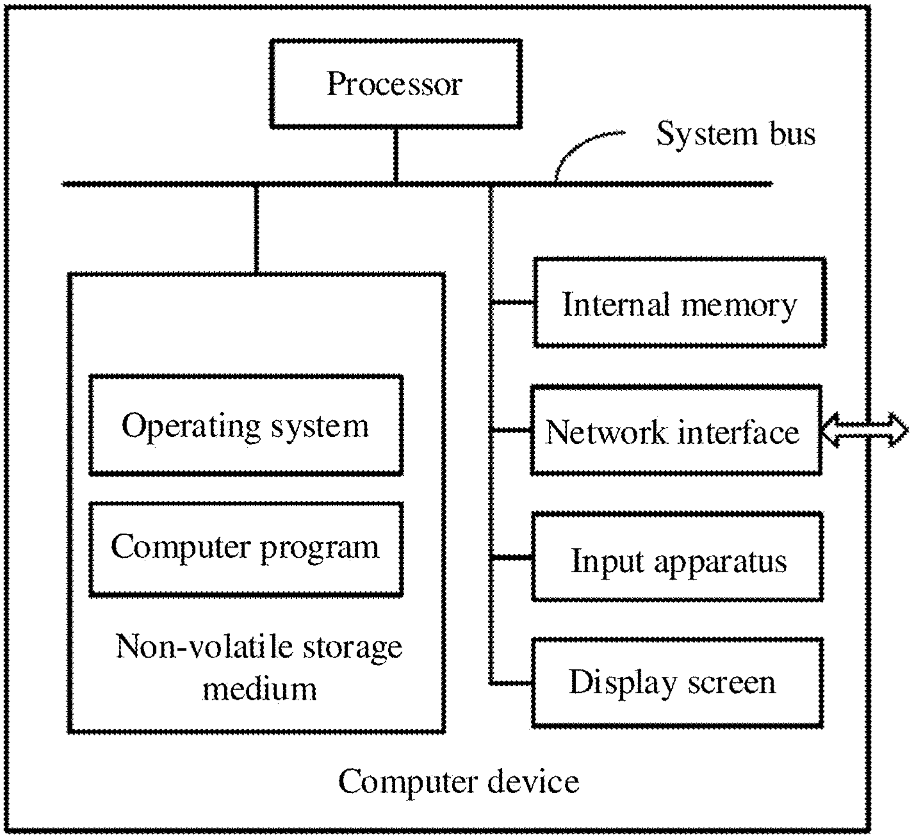
FIG. 4 is another schematic structural diagram of the computer device in an example of the present disclosure.

In one example, provided is a computer device, which may be a client side, with an internal structure thereof as shown in FIG. 4. The computer device includes a processor, a memory, a network interface, a display screen, and an input apparatus which are connected through a system bus, wherein the processor of the computer device is configured for provide computing and control capabilities. The memory of the computer device includes a non-volatile storage medium, and an internal memory. The non-volatile storage medium stores an operating system and a computer program. The internal memory provides an environment for the running of the operating system and the computer programs in the non-volatile storage medium. The network interface of the computer device is configured for communicating with an external server through network connection. The computer program implements, when executed by the processor, functions or steps of the client side for the user information storage control method.

In one example, provided is a computer device, including a memory, a processor, and a computer program stored on the memory and capable of running on the processor, and the processor implements the following steps when executing the computer program:

receiving user data of each user sent by a user side, standardizing each of the user data to obtain a corresponding standard format file, and extracting user information in a preset format from each of the standard format files by utilizing a multi-modal information collection model;

performing data desensitization on a sensitive field in the user information to obtain desensitized data, and generating a mapping subtable according to the desensitized data and a mapping identifier of the sensitive field;

dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas.

In one example, provided is a computer-readable storage medium having a computer program stored therein, wherein the computer program implements, when executed by a processor, the steps of:

receiving user data of each user sent by a user side, standardizing each of the user data to obtain a corresponding standard format file, and extracting user information in a preset format from each of the standard format files by utilizing a multi-modal information collection model;

performing data desensitization on a sensitive field in the user information to obtain desensitized data, and generating a mapping subtable according to the desensitized data and a mapping identifier of the sensitive field;

dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas.

It should be noted that reference may be correspondingly made to the relevant description of the server side and the client side in the above method examples for the above functions or steps which can be implemented by the computer-readable storage medium or the computer device, which will not be described one by one herein to avoid duplication.

It will be understood by those ordinarily skilled in the art that implementing all or part of the flow in the methods of the examples described above may be accomplished by instructing the associated hardware by the computer program which may be stored in the non-volatile computer-readable storage medium and which, when executed, may include the flow of the examples of the methods described above, wherein any reference to the memory, storage, database, or other media used in the examples provided in the present application may include a non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, the RAM are available in many forms such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM), and the like.

In several examples provided in the present disclosure, it should be understood that the disclosed device, apparatus, and method may be implemented in other ways. For example, the apparatus examples described above are merely illustrative, for example, the partitioning of the modules is merely logical function partitioning, and there may be additional partitioning ways in practical implementation.

The modules illustrated as separate components may or may not be physically separated, the components shown as the modules may or may not be physical units, namely, may be located in one place, or may also be distributed over a plurality of network units. Some or all of the modules may be selected to achieve the objects of the solutions of the examples according to actual needs.

In addition, various functional modules in various examples of the present disclosure may be integrated in one processing unit, may be physically present as separate units, or may be integrated in one unit in two or more units. The above integrated units may be implemented in the form of hardware or in the form of hardware plus software functional modules.

It will be evident to those skilled in the art that the present disclosure is not limited to the details of the foregoing illustrative examples, and that the present disclosure may be embodied in other specific forms without departing from the spirit or essential characteristics thereof.

Therefore, the examples are to be considered in all respects as illustrative and not restrictive, the scope of the present disclosure is not limited only by the foregoing description, and all changes which come within the meaning and range of equivalency falling within the scope of protection are therefore intended to be embraced in the present disclosure.

The examples of the present application may acquire and process relevant data based on the artificial intelligence technology, wherein Artificial Intelligence (AI) is a theory, method, technology, and application system which utilizes a digital computer or digital computer-controlled machine to simulate, extend and expand human intelligence, perceive the environment, acquire knowledge and use the knowledge to obtain the best results.

In addition, apparently the word "including" does not exclude other units or steps and the singular does not exclude the plural. A plurality of units or apparatuses recited in the system may also be implemented by one unit or apparatus through software or hardware. The terms first, second, and the like are used for representing names and do not denote any particular order.

Finally, it should be noted that the presence of software tools or components owned by the non-patent applicant in the examples of the present application merely serves to illustrate that a wide selection of software tools or components may be made during the actual implementation of the technical solutions disclosed in the present application, and does not represent that the patent applicant actually uses these illustrated software tools or components; and the above examples are used only for illustrating the technical solutions of the present disclosure and are not intended to limit the technical solutions, although the present disclosure has been described in detail with reference to the preferred examples, it should be understood by those ordinarily skilled in the art that the technical solutions of the present disclosure may be modified or replaced with equivalents without departing from the spirit and scope of the technical solutions of present disclosure.

What is claimed is:

1. A user information storage control method, comprising:

receiving user data of a user sent by a user side, standardizing each of the user data to obtain a corresponding standard format file, and extracting user information in a preset format from each of the standard format files by utilizing a multi-modal information collection model;

performing data desensitization on a sensitive field in the user information to obtain desensitized data, and generating a mapping subtable according to the desensitized data and a mapping identifier of the sensitive field;

dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas;

wherein before the mapping and storing the divided regularized field information and irregularized field information according to a predetermined information code mapping table, the method further comprises:

calculating a multiplicity of regularized field information and irregularized field information in pre-acquired historical stored user information;

filtering regularized field information to be encoded and irregularized field information to be encoded in the regularized field information and the irregularized field information according to the multiplicity; and performing field encoding on the regularized field information to be encoded and the irregularized field information to be encoded, and pooling the encoded regularized field information to be encoded and irregularized field information to be encoded into an information code mapping table.

2. The user information storage control method of claim 1, characterized by further comprising:

after receiving an original user information decryption request carrying the user unique identity code sent by the user side, directly or after permission validation is passed, determining the mapping subtable and the storage mapping table corresponding to the user unique identity code according to the mapping main table, and feeding back original user information of the sensitive field and the non-sensitive field corresponding to the user unique identity code to the user side.

3. The user information storage control method of claim 1, wherein the extracting user information in a preset format from each of the standard format files by utilizing a multi-modal information collection model, comprises:

receiving the input standard format file and a user information extraction instruction by utilizing the multi-modal information collection model, the user information extraction instruction comprising extraction content and a corresponding preset format;

when a file type corresponding to the standard format file is a unique file type, extracting a depth feature of the standard format file by utilizing the multi-modal information collection model to obtain a structured file feature;

when the standard format file is a file set containing files of a plurality of file types, respectively extracting the depth feature of each file in the file set by utilizing the multi-modal information collection model, and fusing the features extracted from each file to obtain structured file features; and acquiring the extraction content in the preset format from the file features according to the user information extraction instruction as user information in the preset format.

4. The user information storage control method of claim 1, wherein before the performing data desensitization on a sensitive field in the user information, the method further comprises:

returning the user information in the preset format to the user side;

generating and displaying a user information display and operation interface with a confirmation operation control and a modification operation control by the user side for a user to send a confirmation instruction for the displayed user information in the preset format based on the confirmation operation control, or for the user to modify the displayed user information in the preset format based on the modification operation control and provide feedback; and when the confirmation instruction fed back by the user side is received, taking the user information in the preset format as data to be subjected to data desensitization, or when modified user information fed back by the user side is received, taking the modified user information as data to be subjected to data desensitization.

5. The user information storage control method of claim 1, wherein the generating a mapping subtable according to the desensitized data and a mapping identifier of the sensitive field, comprises:

identifying a desensitization type corresponding to the desensitized data, and determining a desensitization attribute corresponding to the desensitized data according to the desensitization type;

creating a mapping structure corresponding to the desensitization type according to the desensitization attribute and the mapping identifier of the sensitive field;

generating a mapping format corresponding to the desensitization type in accordance with the mapping structure, and generating a mapping subtable corresponding to the desensitization type according to the mapping format and the mapping identifier; and storing attribute data of the desensitization attribute corresponding to the desensitization type in the mapping subtable.

6. The user information storage control method of claim 1, wherein the mapping and storing the divided regularized field information and irregularized field information according to a predetermined information code mapping table so as to generate a storage mapping table corresponding to the non-sensitive fields, comprises:

querying a regularized information code corresponding to the regularized field information and an irregularized information code corresponding to the irregularized field information in the information code mapping table;

mapping and storing the regularized information code and the regularized field information to obtain a regularized storage mapping table corresponding to the regularized field information;

mapping and storing the irregularized information code and the irregularized field information to obtain an irregularized storage mapping table; and pooling the regularized storage mapping table and the irregularized storage mapping table into a storage mapping table corresponding to the non-sensitive fields.

7. An electronic device, comprising:

at least one processor; and a memory in communication connection with the at least one processor; wherein the memory stores a computer program executable by the at least one processor, and the computer program, when executed by the at least one processor, causes the at least one processor to execute the steps of:

receiving user data of a user sent by a user side, standardizing each of the user data to obtain a corresponding standard format file, and extracting user information in a preset format from each of the standard format files by utilizing a multi-modal information collection model;

performing data desensitization on a sensitive field in the user information to obtain desensitized data, and generating a mapping subtable according to the desensitized data and a mapping identifier of the sensitive field;

dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas;

wherein before executing the step of mapping and storing the divided regularized field information and irregularized field information according to a predetermined information code mapping table, the computer program, when executed by the at least one processor, causes the at least one processor to further execute the steps of:

calculating a multiplicity of regularized field information and irregularized field information in pre-acquired historical stored user information;

filtering regularized field information to be encoded and irregularized field information to be encoded in the regularized field information and the irregularized field information according to the multiplicity; and performing field encoding on the regularized field information to be encoded and the irregularized field information to be encoded, and pooling the encoded regularized field information to be encoded and irregularized field information to be encoded into an information code mapping table.

8. The electronic device of claim 7, wherein the computer program, when executed by the at least one processor, causes the at least one processor to further execute the steps of:

after receiving an original user information decryption request carrying the user unique identity code sent by the user side, directly or after permission validation is passed, determining the mapping subtable and the storage mapping table corresponding to the user unique identity code according to the mapping main table, and feeding back original user information of the sensitive field and the non-sensitive field corresponding to the user unique identity code to the user side.

9. The electronic device of claim 7, wherein the step of extracting user information in a preset format from each of the standard format files by utilizing a multi-modal information collection model, comprises:

receiving the input standard format file and a user information extraction instruction by utilizing the multi-modal information collection model, the user information extraction instruction comprising extraction content and a corresponding preset format;

when a file type corresponding to the standard format file is a unique file type, extracting a depth feature of the standard format file by utilizing the multi-modal information collection model to obtain a structured file feature;

when the standard format file is a file set containing files of a plurality of file types, respectively extracting the depth feature of each file in the file set by utilizing the multi-modal information collection model, and fusing the features extracted from each file to obtain structured file features; and acquiring the extraction content in the preset format from the file features according to the user information extraction instruction as user information in the preset format.

10. The electronic device of claim 7, wherein before executing the step of performing data desensitization on a sensitive field in the user information, the computer program, when executed by the at least one processor, causes the at least one processor to further execute the steps of:

returning the user information in the preset format to the user side;

generating and displaying a user information display and operation interface with a confirmation operation control and a modification operation control by the user side for a user to send a confirmation instruction for the displayed user information in the preset format based on the confirmation operation control, or for the user to modify the displayed user information in the preset format based on the modification operation control and provide feedback; and when the confirmation instruction fed back by the user side is received, taking the user information in the preset format as data to be subjected to data desensitization, or when modified user information fed back by the user side is received, taking the modified user information as data to be subjected to data desensitization.

11. The electronic device of claim 7, wherein the step of generating a mapping subtable according to the desensitized data and a mapping identifier of the sensitive field, comprises:

identifying a desensitization type corresponding to the desensitized data, and determining a desensitization attribute corresponding to the desensitized data according to the desensitization type;

creating a mapping structure corresponding to the desensitization type according to the desensitization attribute and the mapping identifier of the sensitive field;

generating a mapping format corresponding to the desensitization type in accordance with the mapping structure, and generating a mapping subtable corresponding to the desensitization type according to the mapping format and the mapping identifier; and storing attribute data of the desensitization attribute corresponding to the desensitization type in the mapping subtable.

12. The electronic device of claim 7, wherein the step of mapping and storing the divided regularized field information and irregularized field information according to a predetermined information code mapping table so as to generate a storage mapping table corresponding to the non-sensitive fields, comprises:

querying a regularized information code corresponding to the regularized field information and an irregularized information code corresponding to the irregularized field information in the information code mapping table;

mapping and storing the regularized information code and the regularized field information to obtain a regularized storage mapping table corresponding to the regularized field information;

mapping and storing the irregularized information code and the irregularized field information to obtain an irregularized storage mapping table; and pooling the regularized storage mapping table and the irregularized storage mapping table into a storage mapping table corresponding to the non-sensitive fields.

13. A non-volatile computer-readable storage medium having a computer program stored therein, wherein the computer program, when executed by one or more processors, causes the one or more processors to execute the steps of:

receiving user data of a user sent by a user side, standardizing each of the user data to obtain a corresponding standard format file, and extracting user information in a preset format from each of the standard format files by utilizing a multi-modal information collection model;

performing data desensitization on a sensitive field in the user information to obtain desensitized data, and generating a mapping subtable according to the desensitized data and a mapping identifier of the sensitive field;

dividing non-sensitive fields in the user information into regularized field information and irregularized field information, and mapping and storing the divided regularized field information and irregularized field information according to a predetermined information code mapping table so as to generate a storage mapping table corresponding to the non-sensitive fields; and associating a user unique identity code in the user information with the corresponding mapping subtable and storage mapping table to generate a mapping main table, and storing the mapping subtable, the mapping main table and the storage mapping table in a same storage area, or respectively storing the mapping subtable, the mapping main table and the storage mapping table in a plurality of different storage areas;

wherein before executing the step of mapping and storing the divided regularized field information and irregularized field information according to a predetermined information code mapping table, the computer program, when executed by the one or more processors, causes the one or more processors to further execute the steps of:

calculating a multiplicity of regularized field information and irregularized field information in pre-acquired historical stored user information;

filtering regularized field information to be encoded and irregularized field information to be encoded in the regularized field information and the irregularized field information according to the multiplicity; and performing field encoding on the regularized field information to be encoded and the irregularized field information to be encoded, and pooling the encoded regularized field information to be encoded and irregularized field information to be encoded into an information code mapping table.

14. The non-volatile computer-readable storage medium of claim 13, wherein the computer program, when executed by the one or more processors, causes the one or more processors to further execute the steps of:

after receiving an original user information decryption request carrying the user unique identity code sent by the user side, directly or after permission validation is passed, determining the mapping subtable and the storage mapping table corresponding to the user unique identity code according to the mapping main table, and feeding back original user information of the sensitive field and the non-sensitive field corresponding to the user unique identity code to the user side.

15. The non-volatile computer-readable storage medium of claim 13, wherein the step of extracting user information in a preset format from each of the standard format files by utilizing a multi-modal information collection model, comprises:

receiving the input standard format file and a user information extraction instruction by utilizing the multi-modal information collection model, the user information extraction instruction comprising extraction content and a corresponding preset format;

when a file type corresponding to the standard format file is a unique file type, extracting a depth feature of the standard format file by utilizing the multi-modal information collection model to obtain a structured file feature;

when the standard format file is a file set containing files of a plurality of file types, respectively extracting the depth feature of each file in the file set by utilizing the multi-modal information collection model, and fusing the features extracted from each file to obtain structured file features; and acquiring the extraction content in the preset format from the file features according to the user information extraction instruction as user information in the preset format.

16. The non-volatile computer-readable storage medium of claim 13, wherein before executing the step of performing data desensitization on a sensitive field in the user information, the computer program, when executed by the one or more processors, causes the one or more processors to further execute the steps of:

returning the user information in the preset format to the user side;

generating and displaying a user information display and operation interface with a confirmation operation control and a modification operation control by the user side for a user to send a confirmation instruction for the displayed user information in the preset format based on the confirmation operation control, or for the user to modify the displayed user information in the preset format based on the modification operation control and provide feedback; and when the confirmation instruction fed back by the user side is received, taking the user information in the preset format as data to be subjected to data desensitization, or when modified user information fed back by the user side is received, taking the modified user information as data to be subjected to data desensitization.

17. The non-volatile computer-readable storage medium of claim 13, wherein the step of generating a mapping subtable according to the desensitized data and a mapping identifier of the sensitive field, comprises:

identifying a desensitization type corresponding to the desensitized data, and determining a desensitization attribute corresponding to the desensitized data according to the desensitization type;

creating a mapping structure corresponding to the desensitization type according to the desensitization attribute and the mapping identifier of the sensitive field;

generating a mapping format corresponding to the desensitization type in accordance with the mapping structure, and generating a mapping subtable corresponding to the desensitization type according to the mapping format and the mapping identifier; and storing attribute data of the desensitization attribute corresponding to the desensitization type in the mapping subtable.

* * * * *